United States Patent [19]
Goodman

[11] Patent Number: 5,900,272
[45] Date of Patent: May 4, 1999

[54] PLASMA SPRAYING ARC CURRENT MODULATION METHOD

[75] Inventor: Boris Goodman, Rehovot, Israel

[73] Assignee: Plasma Model Ltd., Ness Ziona, Israel

[21] Appl. No.: 08/958,795

[22] Filed: Oct. 27, 1997

[51] Int. Cl.$^6$ .................................................. C23C 4/12
[52] U.S. Cl. ......................... 427/8; 427/446; 219/76.16
[58] Field of Search ..................... 427/8, 446; 219/76.16

[56] References Cited

PUBLICATIONS

S.L. Chen, et al "Experimental Design and Parameter Optimization for Plasma Spraying of Alumina Coatings" in Thermal Spray: International Advances in Coatings Technology, pp. 51–56, 1992 (no month date).

B. Goodman, "The Influence of Plasma Arc Modulation on the Coating Structure" in Thermal Spray: International Advances in Coatings Technology, pp. 581–585, 1992 (no month date).

*Primary Examiner*—Katherine A. Bareford
*Attorney, Agent, or Firm*—Mark M. Friedman

[57] ABSTRACT

An improved segmented anode plasma generator apparatus and method. A combustion mixture of a hydrocarbon and air is injected into the plasma chamber along the direction of the plasma vortex, causing the plasma arc attachment to the anode to be in the diffusion attachment mode, where the plasma arc attaches to the anode surface over a large area, thereby substantially reducing the anode erosion rate. An innovative design of the exit nozzle then reduces the rotational component of the plasma's exit velocity to maximize the axial component of the velocity. By modulating the plasma arc current with very sharp plasma arc current pulses at a frequency related to the dwell time of the spray particles in the plasma, multiple sequential plasma shock waves which disintegrate the spray particles and accelerate them toward the target substrate. The increased velocity of the spray particles combined with their smaller size results in greatly increased cooling rates when they impact the target substrate, thereby resulting in amorphous spray-coatings with improved characteristics, including decreased porosity, higher tensile bond strength, and increased hardness, as well as having a greatly increased deposition rate. The plasma arc current is precisely controlled to assure small time constants in the plasma so that rapid changes in the plasma arc current (approximately $10^8$ amperes per second and higher) form plasma shock waves that strongly impact the spray particles.

8 Claims, 6 Drawing Sheets

PLASMA SPRAYING ARC CURRENT MODULATION METHOD

FIELD AND BACKGROUND OF THE INVENTION

The present invention relates to an improved plasma torch method and apparatus, and, more particularly, to an improved method and apparatus for plasma spraying.

An important use of the direct current (DC) plasma torch is in applying spray-coatings to surfaces. A coating material, in powder or wire form, is fed into a heat source created by an electric arc which passes through a gas and ionizes the gas to form a plasma. The intense heat from the plasma arc melts the coating material into small droplets, hereinafter referred to as "spray particles," and projects them at high velocity onto a prepared target substrate for coating. The resulting spray-coating is hard and resistant to mechanical abrasion as well as to the effects of high temperatures.

As illustrated in FIG. 1, to which reference is now made, a basic prior art plasma generator consists essentially of a hollow cylindrical anode 14 and a concentric inner cathode 10 located near one end of anode 14 and insulated from anode 14 by an insulator 12. A power supply 30 has the negative output terminal thereof connected to cathode 10 and the positive output terminal thereof connected to anode 14. Power supply 30 supplies sufficient current at a sufficient voltage to create and sustain a plasma arc between cathode 10 and anode 14. Cathode 10 is sometimes referred to as the "back electrode." The gas which is to be ionized is forced under pressure into the cavity 18 of anode 14 through a hole 16 in cathode 10, and flows toward an exit nozzle 20 located at the front end of anode 14. A high-current DC arc is initiated from cathode 10 to anode 14, and it is this plasma arc which creates the plasma in cavity 18. The gas which is to be ionized is usually introduced into cavity 18 in a tangential direction when viewed in a transverse cross-section, and the plasma arc which is created and sustained therein assumes a swirl form having an angular rotational component of velocity, this swirl form herein referred to as a "plasma vortex." The present application uses the term "direction of the plasma vortex" to denote the direction of the flow of ionized gas in the plasma vortex. By adjusting the flow of gas down the axis of anode 14, it is possible to force the plasma arc to attach to anode 14 at different distances from cathode 10. The plasma arc in this configuration of plasma generator tends to attach to anode 14 at a small point, and this mode of plasma arc attachment is referred to as the "contraction attachment mode." The contraction attachment mode is characterized by a very high current density, approximately $10^9$ amperes per square meter. It is this high current density which causes rapid erosion of the anode. A coating material is introduced through a hole 22 in exit nozzle 20, where the coating material is melted into spray particles and accelerated toward the target substrate as shown. During operation, outside cavity 18 there is a region 24 of flame-like high enthalpy, high temperature, and high velocity. The present application uses the term "plasma generator" to denote any device for plasma spraying having a hollow cavity, the inner wall of which acts as one electrode for an electric arc, and through which an ionized gas can flow.

There are a number of shortcomings and deficiencies of current plasma generators, which include the following. First the erosion rate of the electrodes is excessive, on the surface 26 of cathode 10, and particularly on anode 14 in the region of the inner wall 28. Second, the enthalpy of the plasma is below the desired level. Third, there is inadequate control over the chemical composition of the spray-coating and the dimensions of the spray particles, their adhesion to the target substrate, and their gas permeability. Fourth, the plasma velocity has an angular rotational component which, for a given kinetic energy, reduces the axial component of the plasma exit velocity, and therefore reduces the ability of the plasma to accelerate the spray particles. Fifth, the cost of gases such as Argon, Helium, and Nitrogen for use in plasma generators is high. In addition, it is desirable to increase the bond strength, microhardness, corrosion resistance, and deposition rate of the spray-coatings over the levels currently attained, and it is also desirable to decrease the porosity and the oxide content of the spray-coatings below the levels currently attained.

Various attempts have been made to address these issues. For example, direct current (DC) plasma generators are utilized in spite of the fact that they involve higher cost and complexity than alternating current (AC) plasma generators, because AC plasma arcs have higher contamination and instability levels, lower enthalpy, and higher nozzle erosion rates. U.S. Pat. No. 2,920,952 to Ducati, et al. discloses methods and apparatus for increasing the useful life of the back electrode. In "Linear Direct Current Plasma Torches" (page 9–43 of *Thermal Plasma and New Materials Technology*, volume 1), M. F. Zhukov summarizes a number of advances in plasma generator design, including segmented anode inserts, gas-swirling interelectrode inserts, and rotating magnetic fields. The purpose of these innovations is to lengthen, control, and stabilize the plasma arc, in order to increase the enthalpy of the plasma and to reduce the electrode erosion. As another example, Israel patent number 103069 to B. Goodman, which is incorporated by reference as if fully set forth herein, discloses a current modulation technique and a method of using a fuel and oxidizer mixture to produce an explosive detonation in the plasma, to increase the acceleration of the spray particles.

FIG. 2 schematically illustrates one of the above-mentioned advances, that of the segmented anode plasma generator. This configuration has a cathode 40 and a segmented anode made of separate annular anode segments 42, 44, and 46. At the exit point of the segmented anode is an exit nozzle 48, after which is a coating material feed 52, where the coating material is introduced and melted into spray particles. One of the advantages of the segmented anode plasma generator is that the attachment point of the plasma arc will be on the inside surface 50 of anode segment 46, rather than at some other point, and so the length of the plasma arc can easily be maintained at a desired level. This is because the positive output terminal of power supply 30 is connected only to segment 46. Segment 42 and segment 44 are electrically floating, and therefore a plasma arc cannot exist between cathode 40 and segment 42, or between cathode 40 and segment 44. In contrast, the configuration shown in FIG. 1 has a plasma arc which can establish the attachment thereof to any point on the inside surface 28 of anode 14. Consequently, the configuration shown in FIG. 1 has what is referred to as a "self-establishing plasma arc". Such a plasma arc can have an arc length which is less than optimum. The enthalpy of the plasma decreases as the arc length thereof decreases, and it is therefore desirable to maintain as long a plasma arc as possible, and the segmented anode plasma generator thereby represents an improvement over the earlier design.

Despite these advances, however, existing plasma generators still fall short of the potential which can be achieved. There is thus a widely recognized need for, and it would be highly advantageous to have, methods and apparatus which would further decrease the rate of electrode erosion, further increase the enthalpy of the plasma, further increase the axial component of the plasma velocity, further increase the velocity of the spray particles, and make other improvements in order to increase the tensile bond strength, microhardness, corrosion resistance, and deposition rate of the spray-coatings, to decrease the porosity and the oxide content of the spray-coatings, and to enable the application of amorphous and ceramic thermal barrier coatings. These goals are met by the present invention.

SUMMARY OF THE INVENTION

According to the present invention there is provided a segmented anode plasma generator into which a combustible gas mixture is injected along the direction of the plasma vortex. The injection of a combustible gas mixture into the plasma aids in diffusing the plasma arc so that the plasma arc attaches to a broad area of the anode surface, rather than at a point of small area. This greatly reduces the erosion of the anode. In addition, the combustible gas mixture is injected along the direction of the plasma vortex to encourage rotation of the plasma inside the anode, further diffusing the plasma arc attachment over as large a surface area as possible. This plasma arc attachment mode is referred to as the "diffusion attachment mode." The diffusion attachment mode is characterized by a nominal current density, approximately $10^7$ amperes per square meter. Thus, in contrast to the contraction attachment mode which is the common plasma arc attachment mode and which has very high current densities (approximately $10^9$ amperes per square meter) and which incurs very high anode erosion rates, the diffusion attachment mode is characterized by a relatively low anode erosion rate, ranging from 1% to 0.1% of the rate of the contraction attachment mode.

Therefore, according to the present invention there is provided a segmented anode plasma generator which creates and sustains a plasma vortex during operation, the segmented anode plasma generator including at least one feed for a combustible gas mixture, such that the combustible gas mixture is injected in a direction selected from the group consisting of the direction of the plasma vortex and the direction opposite to the direction of the plasma vortex.

To compensate for the effects of increased plasma rotation, the present invention provides an innovative exit nozzle design, which features an inner surface with a variation in the distance thereof from the axis according to polar angle. This innovative exit nozzle increases the resistance to angular motion of the plasma in the region of the exit nozzle and thereby decreases the angular component of the velocity thereof at exit. This in turn increases the axial component of the plasma velocity at exit, and enhances the ability of the plasma to accelerate the spray particles toward the target substrate. This contributes to higher deposition rates and improved characteristics of the spray-coating. The use of the innovative exit nozzle design allows the rotation of the plasma to be increased inside the anode cavity without having a detrimental effect on the axial component of the plasma exit velocity.

Therefore, according to the present invention there is provided an improved plasma generator including an exit nozzle having an inner surface, the improvement including an inner surface with a non-circular transverse cross-section, the non-circular transverse cross-section being tangent to a circumscribed circle with a first radius and tangent to an inscribed circle with a second radius, such that the first radius is strictly greater than the second radius.

According to further features in preferred embodiments of the invention described below, the amount of the combustible gas mixture injected into the plasma generator can be adjusted to above or below the amount for a stoichiometric ratio. This allows adjustment of the plasma to range from chemically oxidizing to chemically reducing, in order to provide control over the oxidation of the spray particles.

According to still further features in the described preferred embodiments, the plasma arc current is precisely controlled and plasma arc current pulses are introduced to create extremely sharp plasma shock waves. These extremely sharp plasma shock waves perform several important and valuable functions. First they further increase the temperature and enthalpy of the plasma. Second, they provide additional propulsion for the spray particles toward the target substrate, and thereby contribute to an increased deposition rate. Third, they impact the spray particles with sufficient energy to cause the spray particles to disintegrate into smaller particles. The benefits of smaller spray particles include decreased porosity of the deposited coating on the target substrate and increased cooling rates of the spray particles, which in turn leads to the creation of amorphous spray-coatings with desirable properties, such as higher tensile bond strength and increased surface hardness. In addition, the higher enthalpy of the plasma and the modulation of the plasma arc current in the present invention can also produce ceramic thermal barrier coatings at a deposition rate 5 to 10 times greater than in prior art plasma torches.

It should be noted how these innovations are distinct from previous innovations in the cited prior art, such as that of Israel patent number 103069, which uses a fuel-oxygen mixture to produce an explosive detonation within the plasma generator and also discloses a modulation of the plasma arc current. In this cited prior art, the plasma generator is of the configuration illustrated in FIG. 1, wherein the plasma arc is a self-establishing. In the present invention, however, the plasma generator is a segmented anode plasma generator, with a configuration as illustrated in FIG. 2, and having different geometries and operating characteristics from the plasma generator configuration shown in FIG. 1. Moreover, the cited prior art discloses injecting a fuel-oxygen mixture into the plasma generator to produce an explosive detonation whose purposes is to further accelerate the spray particles. In the present invention, however, the combustible gas mixture which is introduced into the plasma generator does not produce an explosive detonation and does not further accelerate the spray particles. Instead, the purpose of the present invention in introducing a combustible gas mixture into the plasma generator is to put the plasma arc into the diffusion attachment mode and to reduce the level of anode erosion. In addition, the plasma arc current pulses of the present invention are different from the plasma arc current modulation of the cited prior art. As is described below, the plasma arc current pulses of the present invention are at a higher frequency determined according to dwell time measurements on the spray particles, and moreover the plasma arc current in the present invention is precisely determined in order to minimize the time constant of current transients in the plasma arc.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a segmented anode plasma generator for the purpose of spray-coating. The principles of operation and the innovations incorporated into the invention may be better understood with reference to the drawings and the accompanying description.

Figure 1:
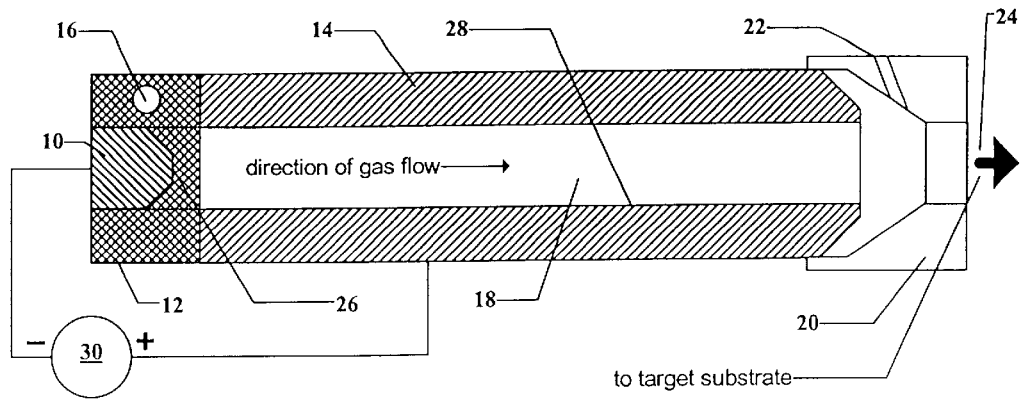
FIG. 1 is an axial cross-section of a basic prior art plasma generator.
Figure 2:
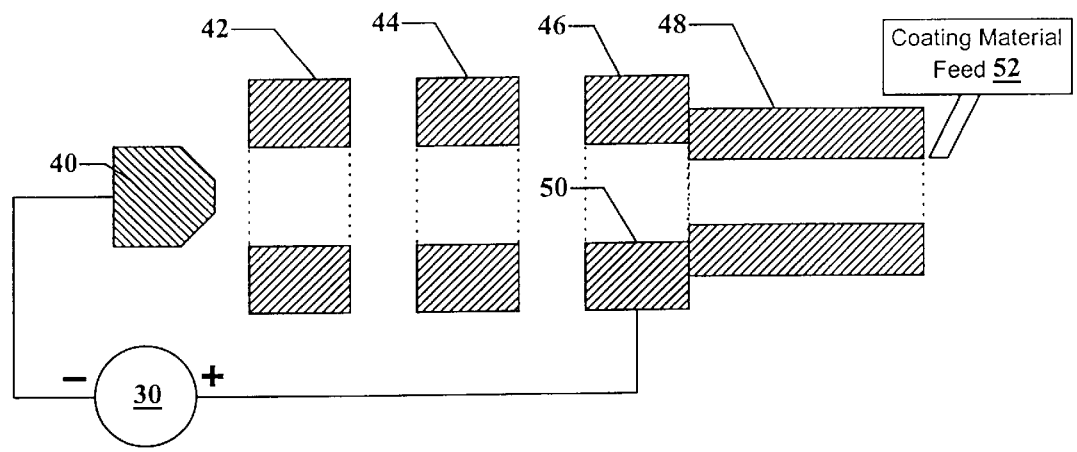
FIG. 2 is a schematic axial cross-section of a prior art segmented anode plasma generator.

Referring now to the drawings, FIG. 2 illustrates the basic prior art configuration for a segmented anode plasma generator, as previously described. Reviewing briefly, this configuration has cathode 40 and a segmented anode made of separate annular anode segments 42, 44, and 46. At the exit point of the segmented anode is exit nozzle 48, after which is located a coating material feed 52 for the coating material which is to be sprayed onto the target substrate. Power supply 30 has the negative output terminal thereof connected to cathode 40 and the positive output terminal thereof connected to anode segment 46. As previously described, the attachment point of the plasma arc will be on the inside surface 50 of anode segment 46.

Figure 3:
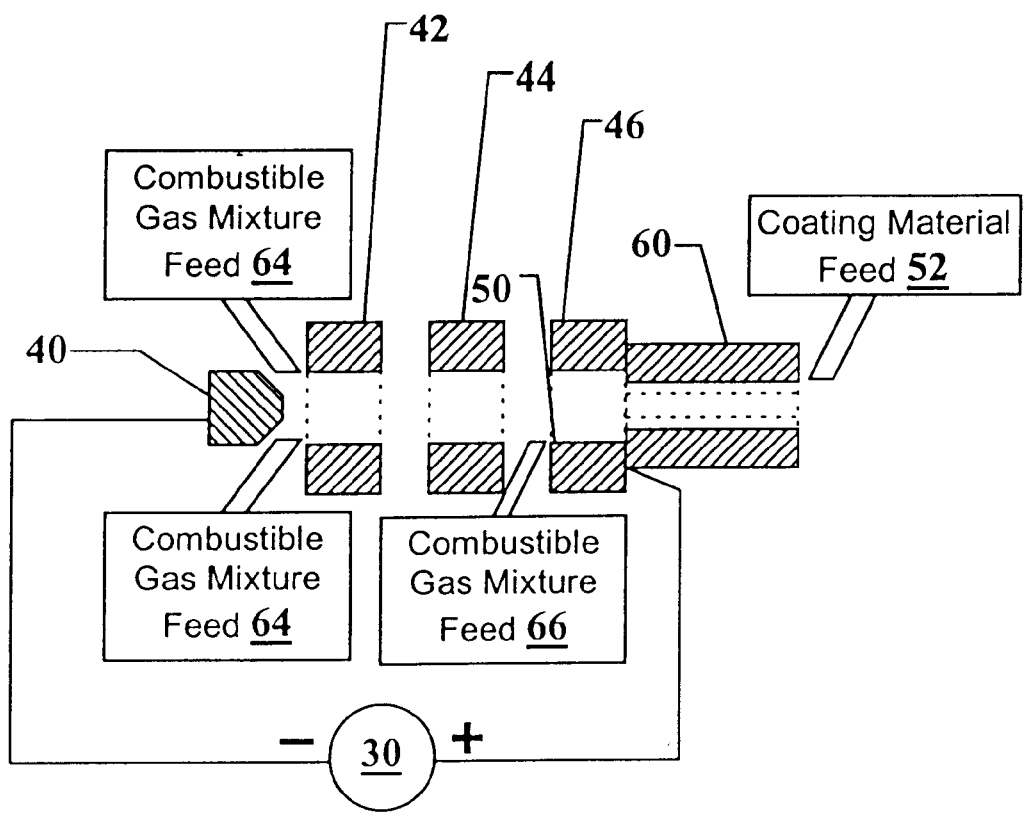
FIG. 3 is a schematic configuration of the combustible gas mixture feed and coating material feed for a plasma generator according to the present invention.

FIG. 3 shows a schematic cross-section of a plasma generator according to the present invention. The function and general placement of cathode 40 and annular segmented anodes 42, 44, and 46, as well as power supply 30 and coating material feed 52, is similar to that of the prior art as illustrated in FIG. 2, but there are additional innovative features, including combustible gas mixture feeds 64 and 66, as well as an innovative exit nozzle 60. A suitable combustible gas mixture can consist of a mixture of hydrocarbon gas, such as propane, and air. Combustible gas mixture feeds 64 are located near cathode 40, whereas combustible gas mixture feed 66 is located near annular segmented anode 46, which is the segmented anode to which the plasma arc will attach, on inner wall 50. The combustible gas mixture is forced into the chamber by combustible gas mixture feed 66 either opposite to or in the same direction as that of the plasma vortex.

As noted previously, the purpose of the combustible gas mixture according to the present invention is to cause the plasma arc to go into the diffusion attachment mode, wherein the plasma arc attaches to a large surface area on inner surface 50 of segmented anode 46. The diffusion attachment mode incurs a greatly reduced rate of anode erosion in comparison with the contraction attachment mode, where the plasma arc attaches to a small area on inner surface 50, and for this reason the diffusion attachment mode is highly preferable, and it is the purpose of the present invention to establish a plasma arc in the diffusion attachment mode. For this reason, the configuration shown in FIG. 3, particularly the location and orientation of combustible gas mixture feed 66 is intended to increase the rotational speed of the plasma within the plasma generator. A high rotational speed enhances the diffusion attachment mode established by the injection of a combustible gas mixture. The combustible gas mixture is also injected at feeds 64 in order to accomplish two important goals: First, it has been shown that this will increase the operating voltage of the plasma arc. Second, it stabilizes the plasma arc current and the operating voltage by reducing the fluctuations in plasma arc current and operating voltage. An increase in operating voltage in turn leads to an increase in the enthalpy of the plasma.

In addition to placing the plasma arc into the diffusion attachment mode, the injecting of a combustible gas mixture can also introduce some control over the oxidation of the spray-coating. The combustible gas may be, for example, a hydrocarbon gas, such as propane. If the combustible gas mixture departs from the stoichiometric ratio of the combustible gas and oxygen (such as the oxygen in air), the plasma will affect the oxidation of the spray-coating. If the ratio of the combustible gas to oxygen (such as the oxygen in air) is less than the stoichiometric ratio, there will be an excess of oxygen (such as the oxygen in air) in the combustible gas mixture, the plasma will be an "oxidizing plasma," and the spray-coating will be more highly oxidized. Such a mixture is referred to as a "lean combustible gas mixture." If, however, the ratio of the combustible gas to oxygen (such as the oxygen in air) is greater than the stoichiometric ratio, there will be an excess of combustible gas, the plasma will be a "reducing plasma," and the spray-coating will be less highly oxidized. Such a mixture is referred to as a "rich combustible gas mixture."

Figure 4:
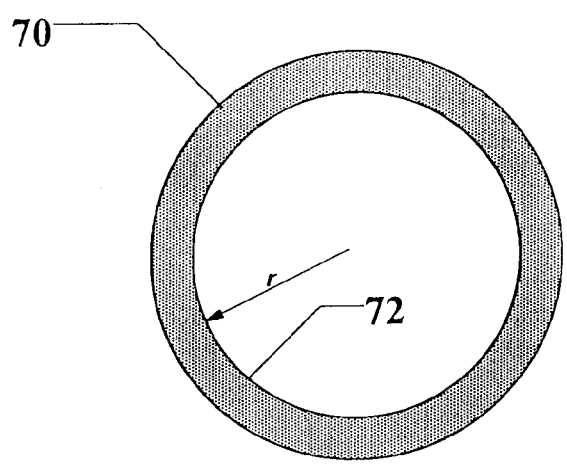
FIG. 4 is a transverse cross-section of the configuration of a prior art exit nozzle for a plasma generator.
Figure 5:
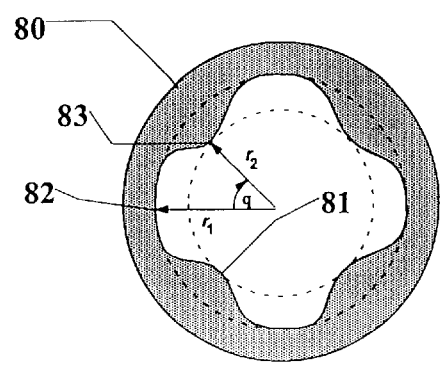
FIG. 5 is a transverse cross-section of a configuration for a plasma generator exit nozzle according to the present invention.
Figure 6:
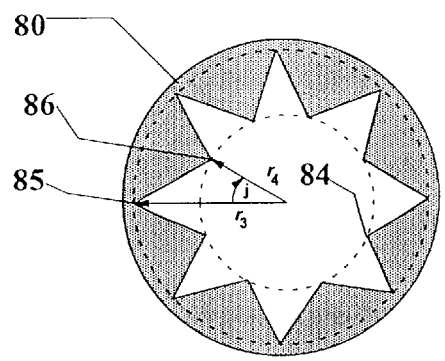
FIG. 6 is a transverse cross-section of an alternative configuration for a plasma generator exit nozzle according to the present invention.

It is noted that exit nozzle 60 has an innovative design according to the present invention. To appreciate this, first consider the prior art configuration of a plasma generator exit nozzle, whose transverse cross-section is illustrated in FIG. 4. It is seen that the prior art plasma generator exit nozzle has, at any longitudinal position along the axis, a circular transverse cross-section on the inner surface 72, with a constant radius r. Referring to FIG. 5, however, an embodiment of a plasma generator exit nozzle configuration according to the present invention features an inner surface with a non-circular transverse cross-section 81, such that non-circular transverse cross-section 81 is tangent to both a circumscribed circle 82 and an inscribed circle 83. The present application uses the term "tangent" with respect to a non-circular transverse cross-section and a circumscribed circle, and with respect to a non-circular transverse cross-section and an inscribed circle to denote that the non-circular transverse cross-section touches, but does not cross, the circumscribed circle and that the non-circular transverse cross-section touches, but does not cross, the inscribed circle, and that therefore the non-circular transverse cross-section lies entirely between the circumscribed circle and the inscribed circle, and therefore that the non-circular transverse cross-section extends over the entire distance between the circumscribed circle and the inscribed circle. Note that for a non-circular transverse cross-section, the circumscribed circle thereof will always be distinct from the inscribed circle thereof, and therefore the radius of the circumscribed circle thereof is always strictly greater than the radius of the inscribed circle thereof. The angular separation from a tangent point of non-circular transverse cross-section 81 with circumscribed circle 83 to the nearest tangent point of non-circular transverse cross-section 81 with inscribed circle 83 is denoted as θ in FIG. 5, and in this embodiment has an average of 45°. Another embodiment of a plasma generator exit nozzle configuration according to the present invention is illustrated in FIG. 6, which also features an inner surface with a non-circular transverse cross-section 84. For example, the radius $r_3$ of circumscribed circle 85 is greater than the radius $r_4$ of inscribed circle 86. The angular separation from a tangent point of non-circular transverse cross-section 84 with circumscribed circle 85 to the nearest tangent point of non-circular transverse cross-section 84 with inscribed circle 86 is denoted as Φ in FIG. 6, and in this embodiment has an average of 22.5°. According to the present invention, other configurations of the exit nozzle are possible provided that the inner surface of the exit nozzle has a non-circular transverse cross-section. The ratio of the inscribed circle's radius to the circumscribed circle's radius is a parameter of the degree of departure from circularity, and, according to the present invention, the ratio of the inscribed circle's radius to the circumscribed circle's radius should be between 0.03 and 0.9. Furthermore, according to the present invention, the average angular separation from a tangent point of the non-circular transverse cross-section with the circumscribed circle to the nearest tangent point of the non-circular transverse cross-section with the inscribed circle should be between 22.5° and 45°. The purpose of this non-circular transverse cross-section is to decrease the angular rotational component of the plasma velocity after the exit nozzle. It has been noted previously that combustible gas mixture feed 66 (FIG. 3) can be arranged to inject the combustible gas mixture along the direction of the plasma vortex to increase the angular rotational velocity of the plasma within the plasma generator, in order to enhance the plasma arc diffusion attachment mode, and thereby reduce anode erosion. An angular rotational component of the plasma velocity, however, is undesirable after the plasma leaves the exit nozzle, since for a given kinetic energy of the plasma an angular rotational component of the velocity will decrease the axial component of the velocity, and will therefore reduce the effectiveness of the plasma to accelerate the spray particles toward the target substrate. Accordingly, the present invention provides this innovative exit nozzle design as described above to decrease the angular rotational component of the plasma velocity after the exit nozzle, and thereby increase the axial component of the plasma velocity.

In addition to reducing anode erosion and increasing the axial component of the plasma velocity, as described above, innovations according to the present invention also increase the deposition rate of the spray-coating, increase the velocity of the spray particles, and decrease the size of the spray particles. Decreasing the size of the spray particles improves the characteristics of the spray-coating, as will be described below. In order to accomplish these goals, the plasma arc current is precisely adjusted and modulated by pulses according to specific parameters as will be described below.

Figure 7:
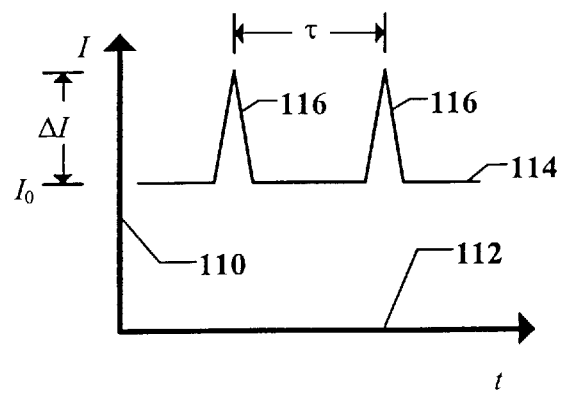
FIG. 7 is a graph illustrating plasma arc current modulation by additive pulses in time.

FIG. 7, to which reference is now made, is a graph of a plasma arc current modulated with additive pulses, which represent a transient increase in the plasma arc current. The ordinate 110 represents the plasma arc current and the abscissa 112 represents the time axis. A plot 114 of the plasma arc current in time shows several pulses 116 occurring at a time interval τ. The baseline plasma arc current is $I_0$, and the magnitude of the plasma arc current pulses is ΔI, so that the plasma arc current at the peak of each pulse is $I_0+\Delta I$.

Figure 8:
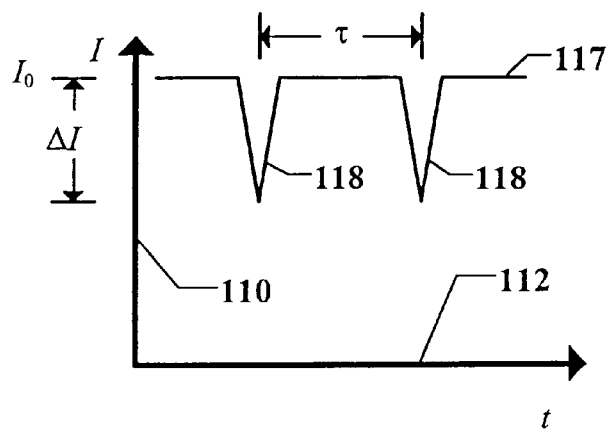
FIG. 8 is a graph illustrating plasma arc current modulation by subtractive pulses in time.

FIG. 8, to which reference is now made, is a graph of a plasma arc current modulated with subtractive pulses, which represent a transient decrease in the plasma arc current. The ordinate 110 represents the plasma arc current and the abscissa 112 represents the time axis. A plot 117 of the plasma arc current in time shows several pulses 118 occurring at a time interval τ. The baseline plasma arc current is $I_0$, and the magnitude of the plasma arc current pulses is ΔI, so that the plasma arc current at the trough of each pulse is $I_0-\Delta I$. Modulation can be effected by using the circuits presented in Israel patent 103069.

The purpose of the plasma arc current pulses is to create plasma shock waves that will strike the spray particles to provide additional acceleration toward the target substrate, and moreover to strike the spray particles with sufficient force that they will disintegrate into smaller spray particles. If the additional acceleration is applied at a point close enough to the plasma generator, in the vicinity of coating material feed 52 (FIG. 3), this can increase the rate of deposition of the spray-coating on the target substrate. Measurements have shown that a plasma arc current pulse modulation according to the present invention can increase the deposition rate from 4 kg/hour to 20 kg/hour, a factor of 5. Disintegration of the spray particles into smaller spray particles has the advantage that the smaller spray particles have a higher surface-to-volume ratio and therefore will have higher cooling rates upon impacting the target substrate. Measurements have shown that ordinary spray particles have a target substrate impact cooling rate of $10^4$ to $10^{5°}$ K/second. The smaller spray particles formed when the ordinary spray particles are disintegrated by the plasma shock waves according to the present invention, however, have a target substrate impact cooling rate of $10^7$ to $10^{8°}$ K/second, approximately 1000 times higher. X-Ray diffraction measurements have shown that, because of these greatly increased target substrate impact cooling rates, the spray particles do not have time to form a regular crystalline structure on the target substrate, and instead form an amorphous spray-coating. Amorphous spray-coatings are characterized by increased surface hardness, decreased oxide content, and decreased porosity, all of which are desirable characteristics.

Modulation of the plasma arc has previously been studied and found to have beneficial effects (B. Goodman, "The influence of Plasma Arc Modulation on the Coating Structure," in *Proceedings of the International Thermal Spray Conference and Exposition*, Orlando, Fla., June 1992, page 581–585; B. Goodman, "Investigation of Dispersion Processes of Sprayed Particles by Means of Torch Modulation," *Proceedings of the 7th National Thermal Spray Conference*, Boston, Mass., June 1994, page 367–370; and B. Goodman, "Mechanisms Influencing on the Parameters of Plasma Coatings in a Modulated Plasma Arc," *Proceedings of the International Thermal Spray Conference*, Kobe, Japan, May 1995, page 389–392). The method according to the present invention introduces new techniques for optimizing the modulation and is therefore beneficial in further improving the quality of plasma spray-coatings in addition to increasing the deposition rates of the spray-coatings.

According to the method of the present invention, in order to achieve the optimum effectiveness of the plasma arc current pulses, both the frequency of the plasma arc current pulses and the magnitude of the plasma arc current must be properly adjusted. The aim of adjusting the frequency of the plasma arc current pulses is to insure that the spray particles will be struck by at least one of the plasma shock waves after leaving the coating material feed and entering the plasma up to the time they impact the target substrate. In a preferred embodiment of the present invention, the spray particles will be struck by a plurality of plasma shock waves before they impact the target substrate.

Figure 9:
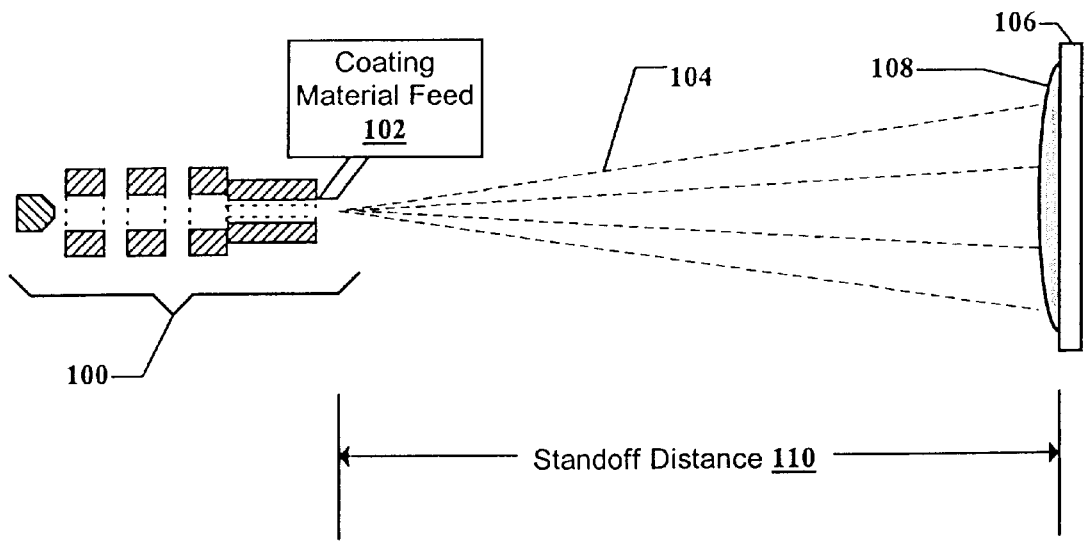
FIG. 9 shows the parameters for measuring the dwell time of the spray particles from a plasma generator to a target substrate.

According to the method of the present invention in order to calculate the plasma arc current pulse frequency that will meet such criteria, it is necessary to know the dwell time of the spray particles, which denotes the time duration from the time the spray particles enter the plasma from the coating material feed until the time they impact the target substrate. FIG. 9 illustrates the parameters for making the appropriate measurements. A plasma generator 100 is located at a standoff distance 110 from a target substrate 106, upon which is being deposited a spray-coating 108 formed by deposit of spray particles originating at a coating material feed 102, which travel along trajectories 104. Measurement of the dwell time of the spray particles in trajectory 104 may be performed according to techniques known in the art (W. Roman et al., "Plasma Spray Gun Particle Distribution Measurements Using Laser/2-D Imaging Techniques," *Proceedings of the Third National Thermal Spray Conference*, Long Beach, Calif., May 1980, page 49–58). If the dwell time of the spray particles is measured to be T, then the time τ between plasma arc current pulses (FIG. 7 and FIG. 8) will be a maximum of T in order to guarantee an average of at least one collision between the spray particles and the plasma shock waves. The minimum frequency $^1f_{min}$ of the plasma arc current pulses for one collision will be given by.

$$^1f_{min} = \frac{1}{\tau} = \frac{1}{T} \quad (1)$$

Additional collisions are desirable, as they increase the acceleration and disintegration of the spray particles. If an average of at least two collisions between the spray particles and the plasma shock waves, the minimum frequency $^2f_{min}$ of the plasma arc current pulses will be given by.

$$^2f_{min} = \frac{2}{\tau} = \frac{2}{T} \quad (2)$$

Some typical values would include standoff distance 110 (FIG. 9) ≈15 cm, T≈0.5 msec, $^1f_{min}$≈2000 Hz, and $^2f_{min}$≈4000 Hz.

Figure 10:
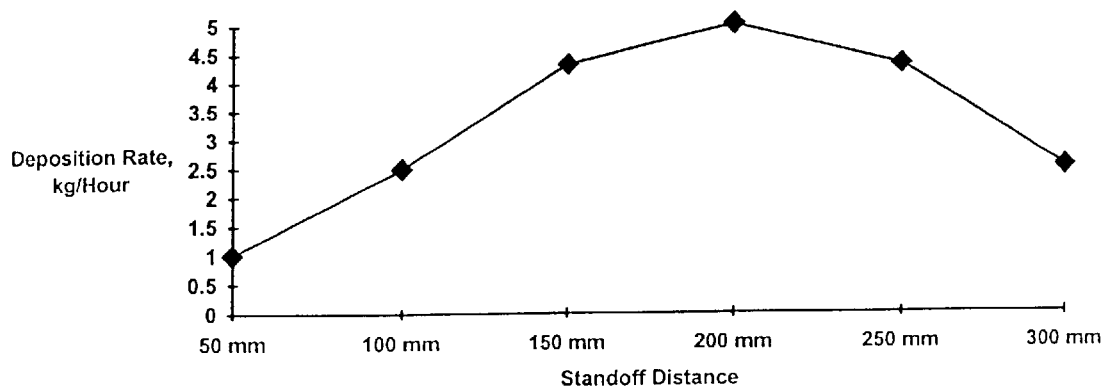
FIG. 10 is a plot of deposition rate versus standoff distance for an amorphous coating.
Figure 11:
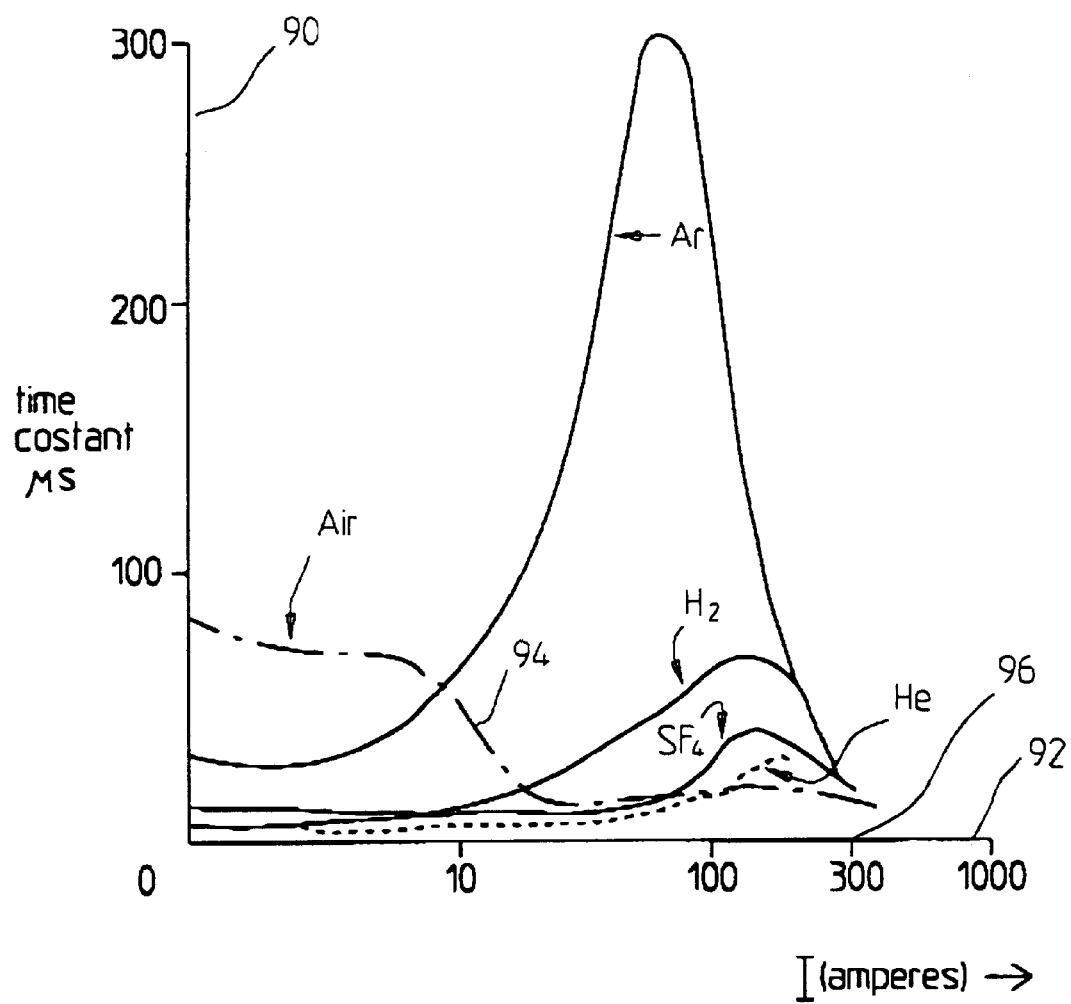
FIG. 11 is a plot of plasma electrical time constants for various gases as a function of the plasma arc current, as known in the art.

According to the method of the present invention, it is also necessary to assure that the plasma arc current pulses create plasma shock waves with the optimal efficiency, so that they will impart the maximum acceleration and disintegrative force to the spray particles. In order to do this, it is necessary that the electrical time constant of the plasma be minimized. Otherwise, the effect of the plasma arc current pulses will be blurred over time. FIG. 11 is a plot of electrical time constants as a function of plasma arc current in various gases, as known in the art (W. Hertz, "Determination of the Conductance Decay Time Constants of Interrupted Arcs by the Aid of a Channel Model," *XI International Conference on Phenomena in Ionized Gases*, Bucharest, Romania, 1969, page 296). FIG. 11 shows an ordinate 90 along which are the electrical time constant values in microseconds, and an abscissa 92 along which is the plasma arc current in amperes plotted logarithmically. The available current range represented in FIG. 11 corresponds to that which is presently attainable for a plasma arc, and therefore the available current range represents the practical limits of obtainable technology. Although it is desirable to attain the minimum electrical time constant for the plasma, attaining this minimum will therefore be subject to the capacity of the equipment utilized. For this reason, it is necessary to select the minimum value of the electrical time constant over the available current range, not simply a local minimum of the electrical time constant curve. Furthermore, depending on the extent and shape of the curve near the minimum value of the electrical time constant, it may be possible to select either additive pulses or subtractive pulses. If the point of minimum electrical time constant is not at an extremity of the available current range, it will be possible to use either additive pulses or subtractive pulses; the one which has the lesser electrical time constant for a pulse should be selected. Factors which influence the choice include the derivative of the electrical time constant curve at the point selected for the baseline plasma arc current. This is illustrated for the example which follows.

In FIG. 11, the plots for various gases include a plot 94 for air, which is the principal gas in the plasma generator. For air, the electrical time constant decreases as the plasma arc current begins to exceed about 300 amperes at a point 96, where the electrical time constant drops below about 10 μsec. The derivative of the curve is negative at point 96, indicating that for increasing plasma arc current the electrical time constant is further decreasing. Thus, it is desirable to modulate the plasma arc current with additive pulses as illustrated in FIG. 7, using a value for $I_0$ of approximately 300 amperes. If the derivative of the curve were positive at a point, it would indicate that for decreasing plasma arc current the electrical time constant is decreasing. Thus, in such a case it is desirable modulate the plasma arc current with subtractive pulses as illustrated in FIG. 8.

By properly adjusting the plasma arc current as described above, the sharpness of the plasma shock waves can be greatly improved. Sharpness of the plasma shock waves is measured in terms of the time rate of change of the plasma arc current. Modulating the plasma arc current without properly selecting the magnitude of the current as described above can result in a time rate of change of the plasma arc current of $10^7$ amperes per second. However, by properly selecting the magnitude of the current as described above can result in a time rate of change of the plasma arc current of $10^8$ to $10^{10}$ amperes per second.

The depositing of amorphous coatings is an important use of the present invention. The higher temperatures and high enthalpy of the plasma arc produced by the present invention, and the multiple plasma shock waves from the plasma arc current pulses disintegrate the spray particles, and their subsequent impact on the target substrate cools them faster than they are able to crystallize. In order to apply amorphous spray-coatings, it is first necessary to set the plasma arc current according to the method described above, and to modulate the plasma arc current as described above. Then, it is necessary to adjust the standoff distance from the coating material feed of the plasma generator to the target substrate so that the deposition rate is maximum, in terms of spray-coating mass deposited on the target substrate per unit time. The optimum standoff distance allows the spray particles enough time in the plasma to be melted and disintegrated, but not too much time that they will begin to cool and crystallize. The optimum standoff distance will result in a maximum deposition rate of the spray-coating in terms of deposited mass per unit time. Measuring the deposition rate as a function of standoff distance will yield data that can be plotted graphically. FIG. 10 is an example of such a plot of deposition rate versus standoff distance, showing that, for this particular example, an optimum standoff distance for forming amorphous spray-coatings is 200 mm.

While the invention has been described with respect to a limited number of embodiments, it will be appreciated that many variations, modifications and other applications of the invention may be made.

What is claimed is:

1. A method of depositing a coating of spray particles of a coating material from a coating material feed onto a target substrate, the method comprising the steps of:
   (a) providing a plasma arc in a gas through which passes a plasma arc current;
   (b) modulating said plasma arc current by plasma arc current pulses having a frequency;
   (c) injecting the coating material into said plasma arc from the coating material feed such that a spray-coating is deposited on the target substrate, and such that the spray particles have a dwell time, said dwell time being the time duration from the time the spray particles enter said plasma arc at the coating material feed until the spray particles impact the target substrate;
   (d) obtaining said dwell time; and
   (e) calculating and adjusting said frequency to be an integral multiple of the reciprocal of said dwell time.

2. The method as in claim 1 wherein the coating is an amorphous coating.

3. The method as in claim 1, wherein said obtaining of said dwell time is done by physical measurement of said time duration from said time the spray particles enter said plasma arc at the coating material feed until said time the spray particles impact the target substrate.

4. The method as in claim 3, wherein the coating is an amorphous coating.

5. The method as in claim 1, wherein said plasma arc current furthermore has a magnitude selectable from an available current range, and wherein said gas has an electrical time constant which is a function of said plasma arc current, the method further comprising the steps of:
   (a) obtaining said electrical time constant of said gas as a function of said plasma arc current; and
   (b) selecting said magnitude of said plasma arc current pulses such that said electrical time constant is at a minimum over said available current range.

6. The method as in claim 5, wherein the coating is an amorphous coating.

7. The method as in claim 5, wherein said plasma arc current pulses furthermore are selectable from the group consisting of additive pulses and subtractive pulses, the method further comprising the step of: selecting said plasma arc current pulses from the group consisting of additive pulses and subtractive pulses, such that the selected plasma arc current pulses have the lesser electrical time constant.

8. The method as in claim 7, wherein the coating is an amorphous coating.

* * * * *